United States Patent [19]

Hicks

[11] 4,247,531
[45] Jan. 27, 1981

[54] CHLORINE DIOXIDE GENERATION APPARATUS AND PROCESS

[75] Inventor: Bruce Hicks, Rio Linda, Calif.

[73] Assignee: Rio Linda Chemical, Rio Linda, Calif.

[21] Appl. No.: 65,927

[22] Filed: Aug. 13, 1979

[51] Int. Cl.³ .............................................. C01B 11/02
[52] U.S. Cl. .................... 423/477; 422/120; 422/122; 422/37; 422/305; 239/310; 210/754; 252/187 H
[58] Field of Search ................. 423/477, 478; 424/149; 422/37

[56] References Cited

U.S. PATENT DOCUMENTS

| 2,745,714 | 5/1956 | Woodward | 423/477 |
| 3,864,456 | 2/1975 | Winfield | 423/478 |
| 4,013,761 | 3/1977 | Ward | 423/477 |
| 4,058,296 | 11/1977 | Weatherky | 137/604 |

FOREIGN PATENT DOCUMENTS

| 757426 | 4/1971 | Belgium | 423/477 |
| 855700 | 11/1952 | Fed. Rep. of Germany | 423/477 |
| 1467024 | 11/1969 | Fed. Rep. of Germany | 423/477 |
| 2343171 | 3/1975 | Fed. Rep. of Germany | 423/477 |

*Primary Examiner*—Brian E. Hearn
*Attorney, Agent, or Firm*—Mark C. Jacobs

[57] ABSTRACT

The present invention is directed to a chlorine dioxide generation apparatus and to a method of generating chlorine dioxide utilizing this apparatus. The novel apparatus comprises a generator having a mix and dwell premix chamber interconnected with a venturi preferably, or to some other source of vacuum, undiluted reactants are permitted to mix and react in the premix chamber, prior to any dilution as by water or other fluid flowing through a venturi eductor to deliver the generated chlorine dioxide to its place of storage or utilization.

9 Claims, 4 Drawing Figures

CHLORINE DIOXIDE GENERATION APPARATUS AND PROCESS

FIELD OF THE INVENTION

This invention relates to the production of chlorine dioxide and more particularly to an apparatus for use in the production of chlorine dioxide.

BACKGROUND

Chlorine dioxide is utilized in a variety of processes including a large number of bactericidal applications, especially in the fields of water treatment and odor abatement. Its usage is continuing to grow for many reasons. Due to the unstable nature of gaseous chlorine dioxide when compressed, it is necessary to produce chlorine dioxide on site rather than to produce it at a plant and ship it for usage when needed. A state of the art process involves the production of chlorine dioxide by the reaction of a chlorinated water stream with an alkaline chlorite, followed by the introduction of the generated chlorine dioxide from such reaction into the particular material or system to be treated.

The prior art is filled with disclosure on various types of chlorine dioxide generators, most of which comprise elongated glass or plastic columns of various constructions. Reference is made, for instance, to U.S. Pat. No. 4,013,761, issued to Olin Mathieson.

Another apparatus known to applicant is that of Westerlund as disclosed in U.S. Pat. No. 3,502,443.

Still another chlorine dioxide generating system is disclosed in the Fuller et al. U.S. Pat. No. 3,816,077, which employs sodium chlorate, sodium chloride and acid for the production of chlorine dioxide.

In addition, applicant is aware of the fact that the Wallace and Tiernan Division of Pennwalt Corporation is engaged in the design and manufacture of chlorine dioxide generators.

All of the prior art chlorine dioxide generators which have employed columns, tend to be large and bulky. They require the usage of chemical feed pumps to meter in the raw materials utilized for the process. One of the problems associated with such prior art units is the inadequacy of the mixing to achieve conversion from the raw materials being employed to chlorine dioxide.

Another problem that is encountered when using state of the art generators of the column type, especially when employing low chlorine dioxide feed rates, or when utilizing water that is highly alkaline, and especially when gaseous chlorine is used as one of the reactants, is that the hydrolysis of the chlorine into HOCl become difficult. Furthermore, the generation reaction operates inefficiently when the pH is not in the neighborhood of 3 to 4. Ofttimes excess chlorine and/or a third chemical, such as a mineral acid, must be added to bring the pH into such a range. Obviously, the additional reactant for the pH maintenance introduces more cost to the process. Furthermore, when gaseous chlorine is unavailable and a three chemical system utilizing sodium chlorite, sodium hypochlorite and hydrochloric acid or some other nonoxidizable mineral acid must be used, the present invention can still be employed utilizing less acid than in the prior art systems, thus rendering a three chemical system more cost effective.

It has now been discovered that the problems of the prior art generators can be overcome and that a superior method of generating chlorine dioxide may be achieved by the utilization of the apparatus of the present invention.

It is therefore on object of this invention to prepare chlorine dioxide from a two chemical reaction in the apparatus of this invention.

It is also an object of this invention to prepare chlorine dioxide by a three chemical reaction when gaseous chlorine is unavailable, utilizing the apparatus of this invention.

Another object of the invention is to provide a process for the preparation of chlorine dioxide that is cost effective.

Yet another object is to provides an apparatus for the in situ generation of chlorine dioxide from a concentrated aqueous alkaline chlorite source.

A yet further object is the provision of the apparatus which can be constructed at low price without the necessity of a large column and which takes up minimal space in a treatment plant.

Still another object is to provide a substantially safe chlorine dioxide generation system that avoids large build ups of undiluted $ClO_2$.

A still further object is to provide a chlorine dioxide generation system of high efficiency under varying water conditions.

Other objects will in part be obvious and will in part appear hereinafter.

SUMMARY OF THE INVENTION

In accordance with this invention, there is provided a system for the preparation of chlorine dioxide which system includes a reaction vessel comprising a vacuum eductor having a T shaped premix chamber in fluid communication with the low pressure zone, i.e. beyond the throat of the venturi of the eductor. A T shaped premix chamber includes inlet means for $NaClO_2$ solution and the gaseous chlorine at opposite ends of the portion of the T normal to the venturi throat, a dwell chamber or contact area in fluid communication therewith terminating in an outlet to the low pressure zone beyond the throat of the venturi for add mixture with water being drawn through said venturi for mixture with the reaction product of sodium chlorite and the chlorine.

In the second embodiment thereof, the T shaped premix chamber includes three inlets, specifically $NaClO_2$ solution one end and sodium hypochlorite and acid at the opposite end of said T. As in the previous embodiment, the inlets are in fluid communication with the premix area which is in further communication with the low pressure zone of the eductor.

It is seen therefore that chlorine dioxide can be prepared by one of two different reactions utilizing the embodiments of the instant invention.

Figure 1:
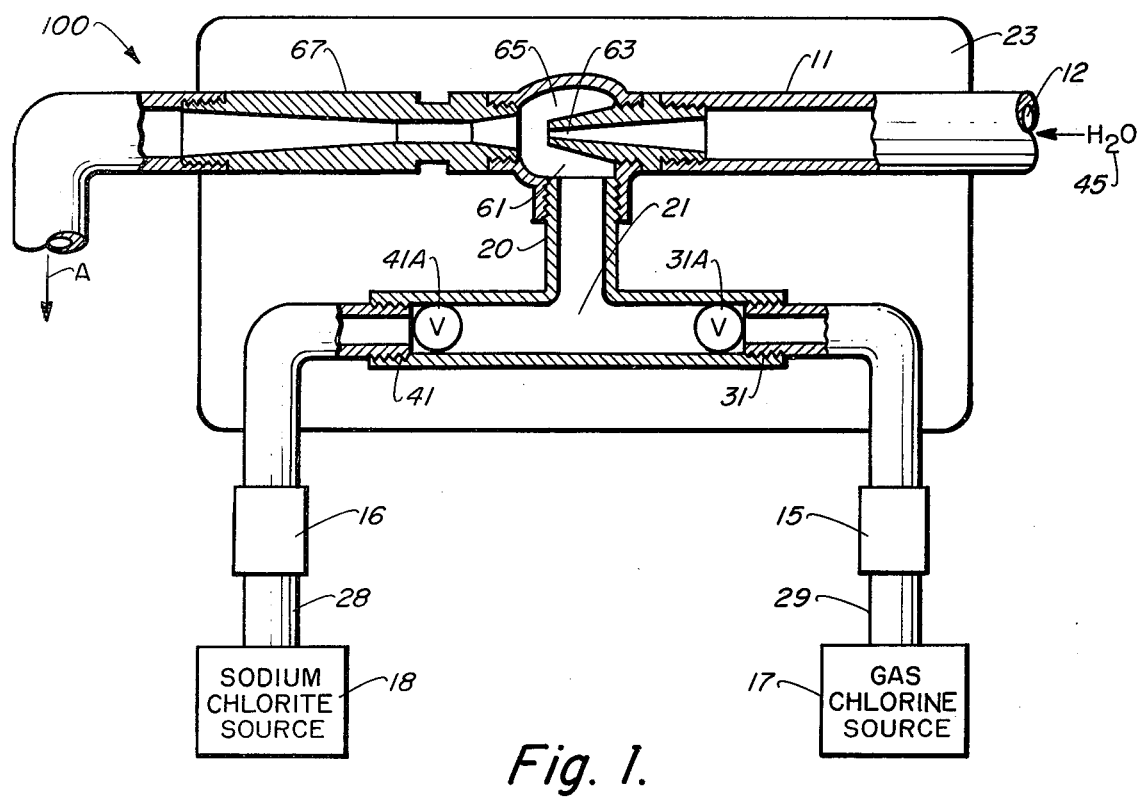
FIG. 1 is a diagrammatical representation illustrating one embodiment of the apparatus of the present invention, wherein a two starting material system is employed for the generaltion of chlorine dioxide.

While a T shaped premix chamber is preferred due to ease of availability in the marketplace, particularly for the two-component T of FIG. 1. Other configurations such as that of the embodiment of FIG. 3, may also be employed. These also feature inlet ports and lines in a main body section and a contact zone also in said main body section. The chamber is in fluid communication with an eductor for removing generated $ClO_2$ and transporting it to storage or utilization.

DETAILED DESCRIPTION OF THE INVENTION

The chlorine dioxide production system of this invention is best understood by reference to the accompanying drawings. Referring now to FIG. 1 wherein 100 designates the chlorine dioxide reactor in general. Thus reactor 100 is shown attached by suitable means not shown to mounting board 23. The apparatus herein comprises the combination of an educter 11 with a premix chamber 20 thus forming generator 100.

Educter 11 includes an inlet 12 for the delivery of generated $ClO_2$ by water 45 which passes through said educter. The dissolved $ClO_2$ in $H_2O$ is designated by arrow A. This combination is delivered through other piping not shown a short distance in concentrated form to water or other material to be treated; for example waste in a sewer plant. The concentrated end product is shown by arrow A exiting educter outlet 67. There is provided a restricted area or venturi throat 63 which creates a low pressure zone 65 downstream therefrom and in fluid communication therewith. More details are recited below.

Also in fluid communication with said educter is Tee shaped premix chamber 20 which may be mounted as desired to plate 23 either alone, or as shown here below the throat, but always in direct fluid communication with the low pressure zone 65. The premix chamber is also called a pre-reaction chamber.

Tee 20 includes inlet ports 41 and 31 for the introduction of reactants. The ports are each sealed off from the environment by checkvalves 41A and 31A respectively. A contact area 21 and an outlet 61 are also provided. Outlet 61 is in fluid communication with mix area 65 of the educter 11.

Chlorite ion source 18 is connected by pipeline 28 to inlet port 41 through rotometer 16. Gaseous chlorine source 17 is connected in like manner via pipe 29 and rotometer 15 to port 31.

Figure 2:
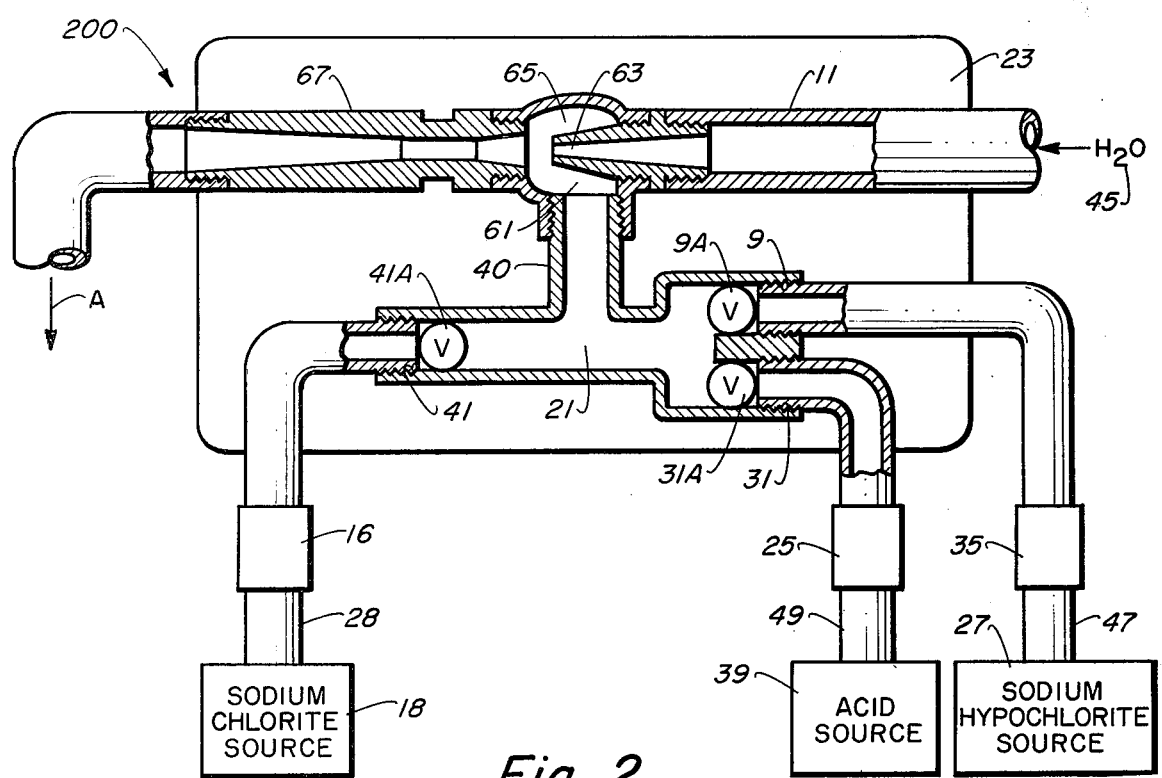
FIG. 2 illustrates a second embodiment of the invention wherein a three starting material system is utilized for the generation of chlorine dioxide.

In FIG. 2 there is shown an alternative embodiment of the invention 200, wherein the raw materials are employed, namely, chlorite ion, hypochlorite ion and an acid. Each of these sources 18, 27 and 39 respectively, are connected fluidly by pipeline 28, 47 and 49 via rotometers 16, 25 and 35 to inlet ports 41, 09 and 31 of Tee 40. Premix chamber 61 which communicates with low pressure zone 65 of the educter 11.

All of the other designators recited with respect to embodiment 100 of FIG. 1 are equally applicable here and as such do not require further description.

In FIG. 1 the two reactants are seen to move inwardly from opposite ends of the elongated portion of the Tee, shown here horizontally disposed, no criticality is seen as to which reactant enters from which side.

While in the embodiment 200, it is seen that the hypochlorite and acid both enter from the same side, and thus have an instanteous moment of mixture prior to contacting the chlorite ion.

The reaction of gas chlorine with concentrated sodium chlorite solutions has to some degree been utilized in previous U.S. Pat. Nos. 2,131,447; 2,388,204; and 2,043,284. However, all of these methods utilize chlorine gas under pressure and use air or an inert gas to dilute and/or strip the thus formed chlorine dioxide gas. Chlorine gas pressure feed systems are rarely used today because of safety problems, being replaced by demand regulators. Also these methods involve the more cumbersome elongated reaction towers or complicated recirculating pump systems that are costly and prone to maintenance problems. All of these methods suffer from the possibility of over production of chlorine dioxide and the handling of gaseious chlorine dioxide, which is very dangerous and prone to explosion. However, by using the present invention safe explosion proof chlorine dioxide generation is accomplished; in that by using the premix Tee with a venturi or any suction device the vacuum thus created evacuates all the chlorine dioxide formed as well as all of the liquid. The apparatus educts both the sodium chlorite solution and the chlorine gas at the same time. This provides the added safety feature that if the vacuum power source stops or the vacuum line is broken all chlorine dioxide generation stops. Thus avoiding over production of chlorine dioxide which could result in an explosion.

The safety aspects of the chlorine dioxide generator of this invention are equally applicable for the three reactant versions. If the vacuum breaks, the reactants are not educted into the contact area 21 and any previously prepared chlorine dioxide in zone 65 is mixed with the terminal portion of the water passing through educter 11.

It has been found that by allowing the reactants to premix in the contact area 21, prior to mixing with water from the educter or the initial dilution and delivery to the place of utilization, that greater efficiency of the generator will result, with there arising a higher conversion rate to chlorine dioxide.

This higher conversion rate can best be understood by reference to the following nonlimiting examples, which illustrate the processes of this invention which require the instantaneous pre-reaction of the chemicals prior to predilution with the educting water.

The chemical equations are as follows:

$$Cl_2 + 2\ NaClO_2 \longrightarrow 2\ ClO_2 + 2\ NaCl \qquad 1.$$
$$ClO_2 + H_2O \longrightarrow ClO_2 \cdot H_2O$$

$$NaClO_2 + NaOCl + 2\ HCl \longrightarrow ClO_2 + 2NaCl + H_2O \qquad 2.$$
$$ClO_2 + H_2O \longrightarrow ClO_2 \cdot H_2O$$

Figure 3:
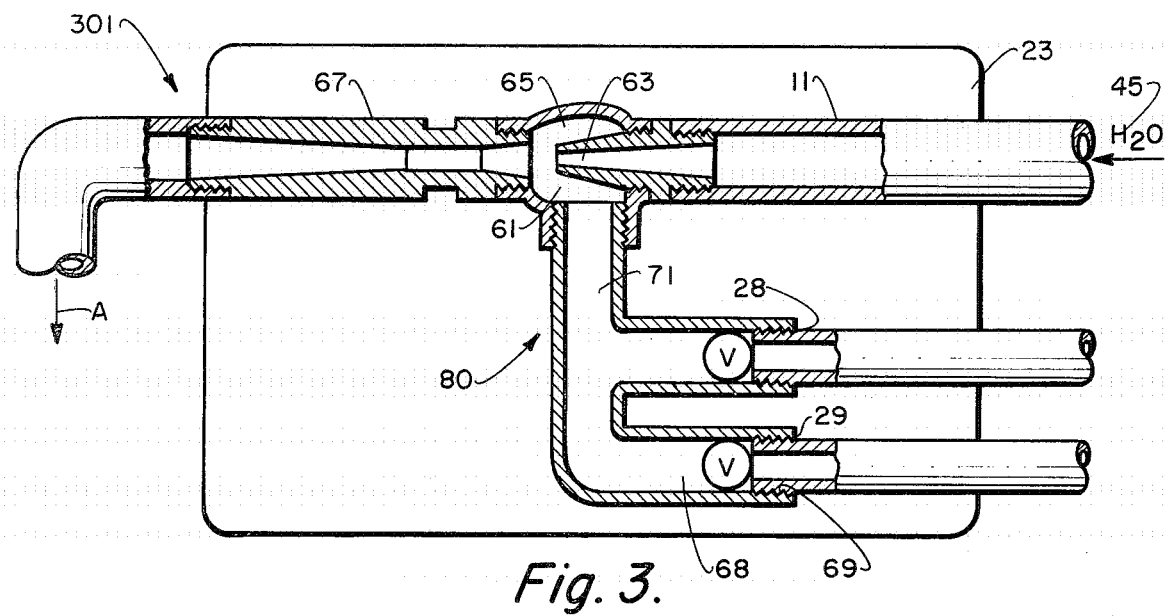
FIG. 3 illustrates an alternate configuration for the premix chamber of FIG. 1.
Figure 4:
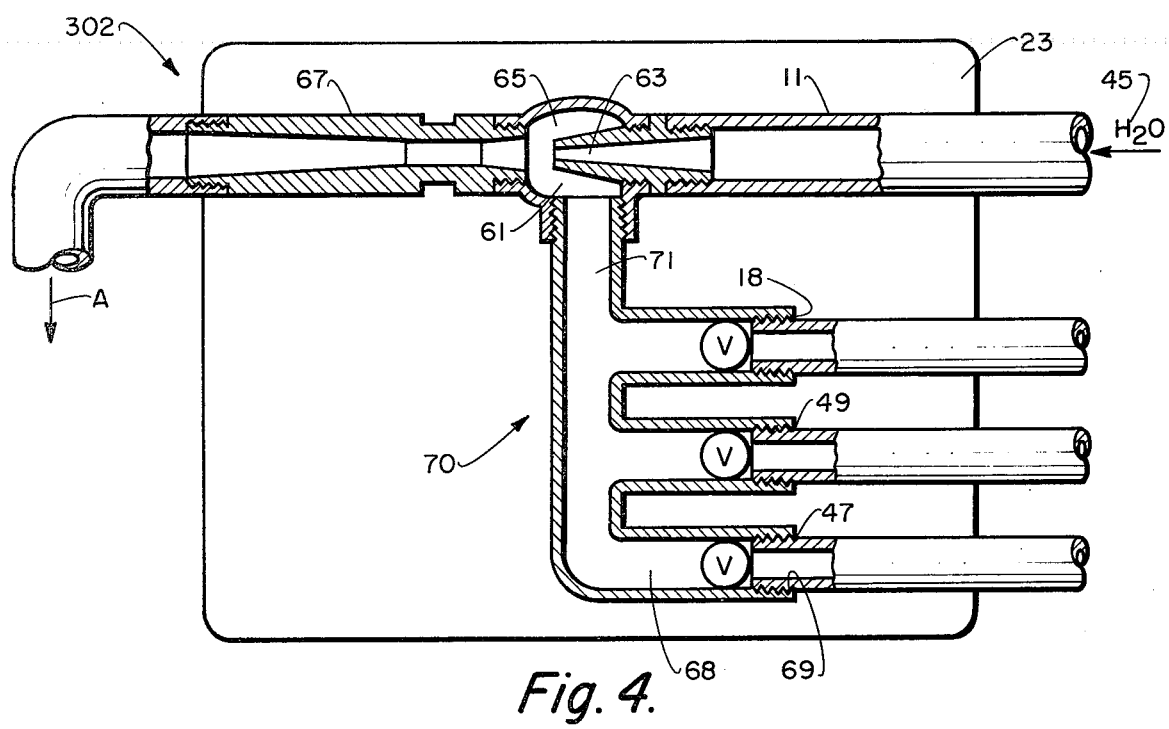
FIG. 4 illustrates diagrammatically an alternate configuration for the premix chamber of FIG. 2.

In FIGS. 3 and 4 are found alternate embodiments of both the 2 and 3 port premix chambers as shown in FIGS. 1 and 2. Since like numbers denote like parts certain items will not be redescribed. Thus embodiments 301 and 302 feature premix chambers 70 and 80, wherein the contact area 71 denotes the location in the chambers wherein the incoming ingredients 18, 49 and 47; 28 and 29 mix in the absence of water to react and form $ClO_2$.

While water 45 is shown as the vacuum forming diluant, any fluid not reactable with and compatible with $ClO_2$ may be employed. Thus an inert gas such as $N_2$ can be employed to remove the reaction products, primarily $ClO_2$ to a location of either short term storage or actual end use, more than likely the latter.

In embodiments 301 and 302 threads 69 are depicted to show that it is within the scope of the invention to attach threaded pipes or lines from sources of the reactants to the female threads 69 of the premix chamber, here 70 and 80. Check valves not shown are also employed.

It is seen therefore that an ingredient, e.g. concentrated aqueous $NaClO_2$ enters port 29 proceeds down inlet pipe 68 into main body portion 67. The ingredient moves through a section of the main body 67 along with one or more other ingredients to the contact area, or contract zone, a location where, all of the reactants can mix and react together to form chlorine dioxide. The location of the contact area 71 is seen to be upstream from the exit 61 into the educter and downstream from the point of entrance of all of the reactants being employed.

While not shown in the figures for ease of understanding the use of rotameters or other valves is contemplated for these embodiments as well.

Previously, with respect to the embodiments of FIGS. 1 and 2 it was mentioned that water 45 or some other fluid should be employed to move the $ClO_2$ from the contact area through the educter. Obviously, an compatible fluid that will not react with the $ClO_2$, liquid or gaseous such as steam or $N_2$ may be employed. The flow rate of this moving fluid 45 should be such that for a given feed rate of reactants in the moving fluid is able to remove all of the $ClO_2$ generated, such that a buildup of product is avoided. Thus for water, the cheapest and probably the easiest fluid to use the flow rate should be such as to exhaust all and absorb substantially all of the $ClO_2$. This rate is readily determinable since it is known that the solubility of $ClO_2$ is $H_2O$ at room temperature is about 2,900 ppm. It has also been determined that an operable vacuum range for any of the embodiments of this system is within the range of 5–30 inches of mercury. Accordingly, it is within the skill of the art to adjust the flow through the educter to remove the product as generated.

As to altering the shape of the pre-reaction chamber lengthening the entry pipes 68 is of no benefit, as the reactants are kept apart. Lengthening the contact zone can be beneficial as the high conversion rates associated with this process are due to the ability of the reactants to pre-react in the substantial absence of any other fluid. Thus, conversion rates of from about 72% to 92% depending on the reactants, i.e. 2 or 3 component, and the presence of packing which serves to slow down the movement of the reactants through the reaction zone, are available from the instant process and apparatus as compared to conversions of about 40% in state of the art column type reactors, when high pH water and/or low chlorine dioxide feed rates are used.

When the instant apparatus and procedures were employed in a high chlorine dioxide feed and neutral pH diluting water was used, conversion rates to chlorine dioxide of 97% to 98% were achieved as compared to prior art recoveries of about 89% chlorine dioxide. Typically such a system would have reactants being reacted wherein 4 to 10 gallons of a 25% $NaClO_2$ solution was employed per hour.

As to overall sizing of the premix chamber of this invention, they may include a contact zone that varies from <1 inch to 10 feet long, or more. But no advantage is seen from the use of such an enormous premix chamber since most normal needs can be satisfied by a chamber having a contact area of 6 inches or less in length with appropriate width, such as 1 inch.

For example, it may also be noted that when a tee shaped pre-reaction chamber having a 4" piece of $\frac{3}{4}$" schedule 40 PVC, with small bead like packing, with a 2" horizontal tee section at a feed ratio of one pound $NaClO_2$ to 0.5 pounds $Cl_2$ gave a 97% to 98% conversion in near neutral pH water at a production rate of 300 pounds of $ClO_2$ per day.

It should be understood that the device of this invention is designated as a premix chamber because the reactants are given a chance to react neat, prior to mixing with any other fluid where further reaction of the reactants may or may not take place. To applicant's knowledge, prior art column reactors introduce the reactants in the presence of a diluting fluid usually water, to avoid any possible buildup of chlorine dioxide molecules. Applicant has found that by removing the product by the educter, that the buildup in a confined volume can be avoided as is deemed essential, yet by use of the instantaneous reaction procedure in the premix chamber, high conversion rates are achievable. Reference is made to U.S. Pat. No. 4,013,761, col. 3, line 55.

As to the educter 11, as is known in the art and can be seen from the figures, the educter includes an inlet 61 which is also the outlet from the pre-reaction chamber since they together from the contiguous apparatus of this invention. The two parts of the apparatus are in fluid communication for the removal of $ClO_2$.

The educter includes a horizontally disposed inlet section 12 having a nozzle 63 therein. The front tip of the nozzle is located substantially centrally above the suction inlet 61 and normal thereto. Spaced apart from said tip and downstream from same, is a diffuser or outlet 67. Diluted or dispersed product is discharged from the educter 11 to a place of utilization or storage as designated by the letter A showing outflow.

Any educter compatibly sized with the pre-reactor may be employed so long as it can remove the product as generated. See FIGS. 1 and 2. A typical manufacturer of such eductors is Pardee Engineering of Berkeley, California. Such educters are described in catalogue B-10-75 which is incorporated herein by reference.

EXAMPLES

EXAMPLE I

The novel apparatus shown in FIG. 1 is demonstrated as follows: Chlorine dioxide was generated in the apparatus of FIG. 1 under the following conditions. A water stream which has been adjusted to a pH of 9.3 by the addition of sodium hydroxide was fed to the apparatus at the rate of 300 gph at a constant pressure of 38 psi. A 15% by weight solution of sodium chlorite was educted through a meter into the generator at the rate of 0.54 gph. Chlorine gas was educted through a commercial chlorinator at the rate of 0.5 lbs per hour. After the generator has been run for approximately 5 minutes to insure a stable continuous process, a sample of the generated chlorine dioxide was collected in a dark bottle and dilutions of 1:10 were immediately made. These samples were then run on a Turner spectrophotometer at 360 nm. The results showed a 72% efficiency in the production of chlorine dioxide.

PRIOR ART COMPARISON

A state of the art generator was run at similar rates: A stream of water which had been adjusted to a pH of 9.3 by the addition of sodium hydroxide was fed to the apparatus at the rate of 300 gph at a constant pressure of 38 psi. This water stream was chlorinated at the rate of 0.66 lbs/hour. A 15% by weight solution of sodium chlorite was pumped into the base of the column at a rate of 0.73 gph. The generator was run for approximately 20 minutes to insure a stable continuous process. A sample was drawn from the exit of the $ClO_2$ generator column. The sample was collected in a dark bottle and dilutions of 1:10 were made. These samples were then tested as above. The results showed a 40.5% efficiency in the conversion to chlorine dioxide.

As can be seen from this example even in high pH waters where the hydrolysis of chlorine is difficult, as well as in low feed rates of chlorine where the pH of the chlorinated water stream does not reach the proper reaction range of pH 3. By simply providing an instant of pre-reaction between the sodium chlorite solution and the chlorine gas, prior to entering the water stream the efficiency of chlorine dioxide production, goes up considerably.

EXAMPLE II

The novel apparatus of FIG. 1 is also demonstrated as follows: Packing material consisting of small bead like chips of an inert composition were placed in the pre-reaction area 21. Chlorine dioxide was then generated under the following conditions. A water stream which had been adjusted to a pH of 9.3 by the addition of sodium hydroxide was fed to the apparatus at the rate of 300 gph at a constant pressure of 38 psi. A 15% by weight solution of sodium chlorite was educted through a meter into the generator at the rate of 0.66 gph. Chlorine gas was educted through a commercial chlorinator at the rate of 0.5 lbs per hour. The generator 100 was run for approximately 5 minutes to insure a stable continuous process. A sample was withdrawn approximately 4 inches from the generator outlet. The sample was collected in a dark bottle and dilutions of 1:10 were immediately taken. These samples were tested as above and showed a 92% efficiency in the production of chlorine dioxide.

EXAMPLE III

Apparatus 200, packed, (not shown) of FIG. 2 is demonstrated as follows: Chlorine dioxide was generated under the following conditions: A water stream was fed to the generator at the rate of 306 gph. The pH was previously adjusted to 9.5 by the addition of sodium hydroxide. The pressure was constant at 38 psi. A 25% by weight solution of sodium chlorite was educted through a rotometer into the generator at the rate of 0.75 gph. A 15% by weight solution of sodium hydrochlorite was educted through a rotometer into the generator at the rate of 0.6 gph. A 30% by weight solution of hydrochloric acid was educted through a rotometer at the rate of 0.3 gph. The generator was run for approximately 5 minutes to insure a stable continuous process. A sample was withdrawn and collected in a dark bottle and dilutions of 1:20 were immediately taken. These samples were then run on a spectrophotometer at 360 nm. The results showed an 89% efficiency in the production of chlorine dioxide.

PRIOR ART COMPARISON

A state of the art generator was run at similar rates. A stream of water which had been adjusted to a pH of 9.5 by the addition of sodium hydroxide was fed at the rate of 306 gph at a constant pressure of 38 psi. A 15% by weight solution of sodium hypochlorite was pumped into the water stream at the rate of 0.52 gph. A 30% by weight concentration of hydrochloric acid was pumped into the water stream at the rate of 0.27 gph. The water stream then entered the bottom of the column where a 25% by weight solution of sodium chlorite was pumped in at the rate of 0.71 gph. The generator was run for approximately 20 minutes to insure a stable continuous process. A sample was drawn from the top of the column outlet and collected in a dark bottle, dilutions of 1:20 were immediately made. These samples were then tested as above. The results showed a 38% efficiency in the production of chlorine dioxide.

As can be seen there has been provided a three chemical system of high efficiency in the production of chlorine dioxide without the need for excess acid and without a column type generator, using the instantaneous precontact process and the apparatus as previously described.

While not shown in the drawings contact areas may contain packing or paddle type mixing means as are known to the art. Typically polyethylene ratchet rings are employed.

The generator apparatus of this invention may be constructed of metal such as corrosion resistant steel or preferably inert plastic such as ABS or polyvinyl chloride.

The Educter should be sized to permit absorption by the delivery water 45 of all of the $ClO_2$ being generated. It is seen, therefore, that the educter's size is keyed to the flow rate of the reactants and is independent of the size of premix chamber.

With respect to the embodiments of FIGS. 2 and 4, the designations as shown are for convenience only. There is no criticality as to which of the three reactants enters alone on one side; nor in which of the reactants enters the premix chamber close to another entering reactant, or closer to the contact zone.

While the use of packing such as polyethylene rings in the contact area 21 is optional, it is believed that their presence provides better more even mixing of the reactants and allows for more surface area contact time prior to admixture with water 45. Any state of the art packing can be used for this purpose as long as it is not affected by the reactants or the end product.

In constructing the generator of this invention the size of the reaction area 21 can be varied according to the feed rate of the raw materials as desired.

While the educter and the premix chamber as shown in the figures as one continuous device, it is understood that two separate members interconnected by threads or some other joining means available in the art may be employed. Thus the diameter of the premix chamber need not correspond to the dizmeter of the suction inlet of the educter.

THE PROCESS TECHNOLOGY

As has been indicated, the general reactions for both the two and three component processes are known to the art. The advance of this invention is seen to be the instantaneous pre-reaction of the undiluted reactants in a zone for such purpose, removed from the dilution or possible quenching effect of water. One process involves the reaction of chlorine gas and the sodium or other alkaline chlorite in a premix area, such as zone 21 of the apparatus of this invention. As the chlorine dioxide is formed at that location it is sucked up by the educter and either dispersed or dissolved in moving water 45, air, steam or other diluting fluid. This water containing dissolved $ClO_2$ is then moved out of the educter as shown by arrow A for use at the point of location. Actual reaction time before eduction is momentary.

This process has the benefit of not premitting large volumes of chlorine dioxide to build up as the gas is dissolved immediately after generation, thus moving the reaction equilibruim to the right, such that as the product is removed more product can form thus giving rise to the higher yields as demonstrated above.

It is readily seen that the three component system of the equation is operative in the same manner, thus permitting the increased yield of chlorine dioxide form the reaction of the reactants prior to the initial dilution.

It has been demonstrated that a very short, packed chamber that provides instantaneous contact, measured in fractions of a second has provided excellent efficiencies at common feed rates found in industrial applications that utilize the chlorine chlorite art of chlorine dioxide generation.

As demonstrated above, even an instant of precontact will improve the efficiency considerably in high alkaline water or when using low feed rates.

The reactants employable in the two component process are any alkaline chlorite such as sodium or potassium preferably and gaseous chlorine. The three component system utilizes a similar hypochlorite source, usually alkaline such as Na or K, an alkaline chlorite such as Na or K and a mineral acid such as $H_3PO_4$, $H_2SO_4$ or $HCl$, of concentrations known to the art. The chlorite and hypochlorite should be used in a solution form for the practice of this invention. It has been found that concentrated solutions of these reactants such as above 10% give excellent results and that what would normally be called a dilute solution, i.e. below 10% by weight of reactant, also give excellent results. The reason being that the so called dilute solution is relatively concentrated when compared with prior art solutions which call for the reactant to be diluted with up to 99% water.

The term premix or pre-reaction chamber is employed because the reactants pre-react here prior to dilution, after which the actual end product namely diluted chlorine dioxide is delivered for storage or use.

Since certain changes may be made in the above apparatuses and processes without departing from the scope of the invention herein involved. It is intended therefore, that all matter contained in the above description shall be interpreted as illustrative and not in a limiting sense.

I claim:

1. A process for the preparation of chlorine dioxide which comprises:
    (a) substantially instantaneously reacting compounds, which when reacted together yield chlorine dioxide, in the absence of dilution water, in a reaction zone sized to permit only substantially instantaneous contact of said compounds.
    (b) transferring the generated chlorine dioxide from the reaction zone to another location by immediately educting the chlorine dioxide by suction generated by the movement of a diluting fluid through a venturi, the flow rate of said diluting fluid being correlated to the flow rate of the reacting compounds to avoid any buildup of chlorine dioxide in the reaction zone.

2. The process of claim 1 wherein the compounds which yield chlorine dioxide are an alkaline chlorite and gaseous chlorine.

3. The process of claim 1 wherein the compounds which when reacted yield chlorine dioxide are a alkaline hypochlorite, a alkaline chlorite, and a mineral acid.

4. The process of claim 2 wherein the diluting fluid is water.

5. The process in claim 3 wherein the diluting fluid is water.

6. The process of preparing chlorine dioxide which comprises:
    (a) introducing an aqueous alkaline chlorite and gaseous chlorine into opposite ends of a tee shaped reaction chamber in the absence of dilution water;
    (b) reacting said chlorite and chlorine momentarily;
    (c) educting the formed chlorine dioxide from said chamber by moving a diluting fluid through a venturi;
    (d) diluting the concentration of said chlorine dioxide with said fluid.

7. The process of claim 6 wherein the diluting fluid is water.

8. The process of preparing chlorine dioxide which comprises:
    (a) introducing an alkaline chlorite, an alkaline hypochlorite and a mineral acid into a tee shaped reaction chamber;
    (b) momentarily reacting said chlorite hypochlorite and acid in the absence of diluting water to form chlorine dioxide;
    (c) educting the chlorine dioxide from said chamber by moving a diluting fluid through a venturi;
    (d) diluting the chlorine dioxide concentration with said fluid.

9. The process of preparing $CO_2$ as per claim 8 wherein the diluting fluid is water.

* * * * *